United States Patent [19]

Schaffer

[11] Patent Number: 5,069,289
[45] Date of Patent: Dec. 3, 1991

[54] PROCESS FOR GLUING TO A HORSE'S HOOF

[76] Inventor: Allan B. Schaffer, 4751 Del Moreno Dr., Woodland Hills, Calif. 91364

[21] Appl. No.: 539,425

[22] Filed: Jun. 18, 1990

[51] Int. Cl.$^5$ ................................................ A01L 3/00
[52] U.S. Cl. .................................. 168/4; 168/DIG. 1
[58] Field of Search ..................... 168/4, 17, DIG. 1; 606/212

[56] References Cited

U.S. PATENT DOCUMENTS

| | | | |
|---|---|---|---|
| 3,470,960 | 10/1969 | Masone | 168/4 |
| 3,706,621 | 12/1972 | Lichtman | 156/322 X |
| 4,182,340 | 1/1980 | Spencer | 606/212 |
| 4,896,727 | 1/1990 | Busser | 168/4 |

FOREIGN PATENT DOCUMENTS 1405211 9/1975 United Kingdom ......... 168/DIG. 1

Primary Examiner—Robert P. Swiatek

[57] ABSTRACT

A new process for attaching a non-metallic shoe to a horse's hoof and for repairing a crack in the hoof. The process involves preheating the hoof and the part to be attached, if any, to about 275 degrees F. and then bonding with a hard paste-type urethane adhesive. The adhesive undergoes a phase change from paste to liquid at the hot surface and thereby produces a highly wetting liquid film that leads to a bond many times stronger than would have otherwise occurred.

5 Claims, 1 Drawing Sheet

PROCESS FOR GLUING TO A HORSE'S HOOF

BACKGROUND OF THE INVENTION

1. Technical Field

This invention is concerned with gluing to a horse's hoof, either to attach an object such as a shoe or to repair a crack in the hoof.

2. Related Art

Examples of potential equine applications for adhesives include attaching objects, e.g. polyurethane horseshoes, and patching cracks. However most available adhesives do not adhere sufficiently well either to the hoof material, or to the object being bolded to the hoof, or to both. Even if reasonably good static bonds are achieved, failure often still occurs as a consequence of the high stress to which the bond is subsequently subjected when the horse runs. The impact load on the hoof is typically about 2000 pounds. Also the curing time of many adhesives presents a major problem; the adhesive must be substantially set in minutes or at most tens of minutes since a horse cannot generally be held inactive for an extended period.

These problems in one form or another cause all the common adhesives as normally used (including hot melts, epoxies, urethanes, acrylics, and cyanoacrylates) to have shortcomings. Although satisfactory bonds have been achieved for a few special configurations, there does not exist in the prior art any process generally successful across the spectrum of potential applications.

SUMMARY OF THE INVENTION

Central to this invention is a new process for gluing to a horse's hoof. The process involves heating both the hoof and an attachable part (if any) to a temperature of about 275 degrees F. prior to applying a hard paste-type urethane adhesive. Immediately at the hot surface(s) the adhesive undergoes a phase change from paste to liquid and produces a thin liquid film that is highly wetting. The bond achieved upon cooling is many times stronger than would have resulted without the phase change. The process can be used to attach to the hoof an object such as a non-metallic horseshoe or to repair a crack in the hoof.

DESCRIPTION OF THE PREFERRED EMBODIMENT

The object of this invention is a process that will enable successful gluing to a horse's hoof over the spectrum of applications. Successful gluing implies no debonding for at least a month during which time the horse goes through its normal motions.

The invention is based on the discovery of a new process that increases by manyfold the bond strength of a certain type of urethane adhesive. The adhesive of interest is a two-component paste-type urethane having a hardness in excess of about 50 on the Shore D scale. A paste-type adhesive is one that becomes a paste immediately upon mixing of the two components, which themselves may or may not be in the paste form. If this urethane adhesive is brought into contact with a surface preheated to a temperature of about 275 degrees F., a phase change from paste to liquid occurs at the hot surface. A thin liquid film is produced, and this film greatly enhances the wetting, intimacy of contact, and resulting forces of molecular attraction between the adhesive and the substrate. When the film resolidifies upon cooling, the result is a surface bond many times stronger than would have occurred had the urethane been applied at a lower temperature that does not produce the phase change. What would have been a relatively weak bond becomes a very strong bond.

The enhancement of bond strength with substrate temperature commences at about 200 degrees F. and increases as the substrate temperature is raised. Most of the benefit is achieved by about 275 degrees F. Moreover if the temperature exceeds about 300 degrees F., irreversible damage to the materials can occur.

This method can be utilized to improve markedly the bonding of urethane adhesives to surfaces that can be reversibly heated to a temperature in excess of about 250 degrees F. In the particular applications described herein for horses, the process can be applied both to the hoof and to a part, if any, to be attached to the hoof. For example when a part such as a horseshoe or a piece to bridge a crack is to be attached, both the hoof and the part are preheated to the prescribed temperature prior to gluing with the specified urethane. On the other hand, if a crack is repaired with adhesive alone, obviously only the hoof need be heated.

Figure 2:
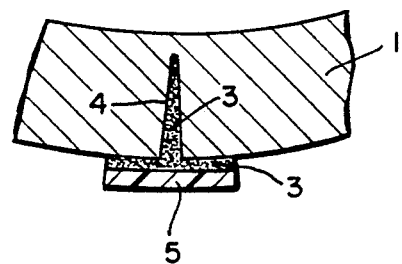
FIG. 2 is a cross-section view showing the repair of a crack in a horse's hoof by means of an attaching piece.
Figure 3:
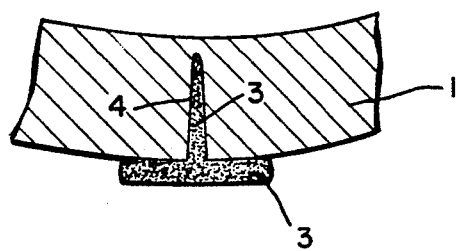
FIG. 3 is a cross-section view showing the repair of a crack in a horse's hoof by means of an adhesive alone.

The preferred embodiments refer to attaching a non-metallic horseshoe, FIG. I; attaching a piece to bridge a crack, FIG. 2; and patching a crack with adhesive alone, FIG. 3.

Figure 1:
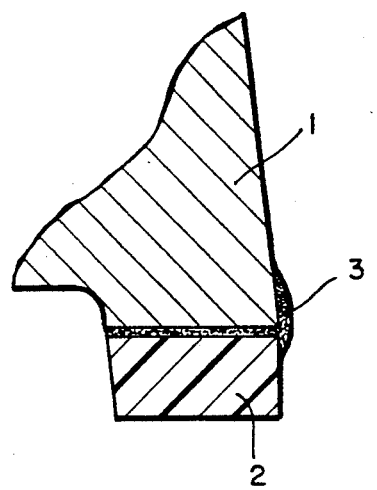
FIG. 1 is a cross-section view showing a shoe glued to a horses's hoof.

In FIG. 1, 1 is the hoof. 2 is the horseshoe. 3 is the urethane adhesive. Not shown are the highly wetting surface films formed when the green adhesive comes into contact with the heated hoof and the heated shoe.

In FIG. 2, 1 is the hoof. 4 is the crack. 3 is the urethane adhesive. 5 is the attaching piece.

In FIG. 3, 1 is the hoof. 4 is the crack. 3 is the urethane adhesive. Here there is no attached part; the adhesive 3 serves as both the attaching mechanism and the strengthening member.

The horseshoe is preheated in an oven to a temperature of approximately 275 degrees F. The regions of the hoof to receive adhesive are cleaned with a solvent. Then a commercially available surface temperature indicator is applied at several spots at or near each of these regions. Next with a heat gun, these regions are heated to about 275 degrees F. Bringing the regions to desired temperature usually takes less than a minute. As soon as the hoof is at temperature, the adhesive is applied and then the shoe is attached. If made from polyurethane, the horseshoe is sufficiently flexible at 275 degrees F. to allow reshaping during the attachment process so as to fit the individual horse. However a precise fit is not required because of the gap-filling nature of the paste adhesive.

As mentioned earlier, the process described herein works for only a class of urethane adhesives, in particular a two-component paste-type urethane adhesive having a Shore D hardness in excess of about 50. Furthermore it is desirable to verify that a phase change producing a thin clear liquid film occurs when the adhesive is brought into contact with surfaces heated to above about 250 degrees F.

The optimum adhesive is Polymer Engineering Corporation "Duramix 4040" two-component urethane. It is conveniently applied by means of a handheld dispenser from a standard dual cartridge with a mixing nozzle attached. The operation of applying the adhesive and attaching the shoe usually takes only about half a minute. The "Duramix 4040" sets sufficiently rapidly that the horse can be allowed to stand on the hoof in about a minute after placing the shoe.

The time for the whole process of heating the hoof, applying the adhesive, placing the shoe, and letting the adhesive set is within the three minutes or so tolerance that the average horse has for allowing his foot be held in the shoeing position. After standing on the glued shoe for a minute or so, the horse can be allowed to walk around, and full activity is permissible in about an hour. Shoes glued in this manner normally remain firmly attached for the six to eight weeks interval typically associated with reshoeing because of hoof growth.

The procedure for attaching a piece to bridge a crack, FIG. 2, is similar except that the crack is filled with adhesive at the same time that the adhesive is being applied to the external surface of the hoof. A significant side benefit in patching cracks by the process disclosed in this invention whereby the hoof is preheated to about 275 degrees F., is that the crack region is sterilized so that infection is inhibited when the crack is filled. The procedure for patching a crack with adhesive alone, FIG. 3, is much the same except that a coat of adhesive is used in place of the attaching piece.

I claim:

1. A process for bonding to a horse's hoof wherein the hoof is preheated to a temperature of approximately 275 degrees F. prior to the application of a two-component paste-type urethane adhesive having a hardness in excess of about 50 on the Shore D scale so that said adhesive undergoes a phase change at the surface of the heated hoof to produce a highly wetting liquid film.

2. The process of claim 1 wherein the adhesive fills and bridges a crack or other cavity in the hoof so as to provide a rigid reinforcement of said crack or cavity.

3. The process of claim 1 wherein a non metallic part capable of being reversibly heated to about 275 degrees F. is preheated to said temperature and attached to the hoof immediately after the adhesive has been applied so that said adhesive undergoes a phase change at the surface of said part to produce a highly wetting liquid film at said surface.

4. The process of claim 3 wherein the part to be attached is a horseshoe.

5. The process of claim 3 wherein the part to be attached is a piece to bridge a crack or other cavity.

* * * * *